United States Patent
Fefferman

(10) Patent No.: US 10,061,954 B2
(45) Date of Patent: Aug. 28, 2018

(54) ON-SCREEN CODE STABILIZATION

(71) Applicant: PAYPAL, INC., San Jose, CA (US)

(72) Inventor: David Kenneth Fefferman, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/214,381

(22) Filed: Jul. 19, 2016

(65) Prior Publication Data

US 2016/0328590 A1 Nov. 10, 2016

Related U.S. Application Data

(63) Continuation of application No. 14/459,230, filed on Aug. 13, 2014, now Pat. No. 9,424,570.

(51) Int. Cl.
| | | |
|---|---|---|
| *G06K 19/00* | (2006.01) | |
| *G06K 7/10* | (2006.01) | |
| *G06Q 20/32* | (2012.01) | |
| *G06K 19/06* | (2006.01) | |
| *G06T 3/20* | (2006.01) | |
| *G06T 3/60* | (2006.01) | |
| *G06T 3/00* | (2006.01) | |
| *G06T 3/40* | (2006.01) | |
| *G06Q 20/20* | (2012.01) | |
| *G06K 7/14* | (2006.01) | |
| *H04W 4/02* | (2018.01) | |

(52) U.S. Cl.
CPC ...... *G06K 7/10811* (2013.01); *G06K 7/10732* (2013.01); *G06K 7/1417* (2013.01); *G06K 7/1443* (2013.01); *G06K 7/1447* (2013.01); *G06K 19/06037* (2013.01); *G06K 19/06112* (2013.01); *G06K 19/06131* (2013.01); *G06Q 20/208* (2013.01); *G06Q 20/32* (2013.01); *G06Q 20/3274* (2013.01); *G06Q 20/3276* (2013.01); *G06T 3/0006* (2013.01); *G06T 3/20* (2013.01); *G06T 3/40* (2013.01); *G06T 3/60* (2013.01); *H04W 4/026* (2013.01)

(58) Field of Classification Search
USPC ................................ 235/435, 439, 454, 462
See application file for complete search history.

(56) References Cited

U.S. PATENT DOCUMENTS

| | | | |
|---|---|---|---|
| 2007/0038735 A1* | 2/2007 | Tsunoda | H04N 1/00127 709/223 |
| 2010/0149187 A1 | 6/2010 | Slavin et al. | |
| 2012/0048937 A1* | 3/2012 | Dahari | G06K 7/14 235/462.08 |
| 2012/0160912 A1 | 6/2012 | Laracey | |
| 2012/0249792 A1* | 10/2012 | Wilborn | H04N 5/23254 348/148 |

\* cited by examiner

*Primary Examiner* — Matthew Mikels
(74) *Attorney, Agent, or Firm* — Haynes & Boone, LLP

(57) ABSTRACT

Methods and systems for stabilizing an on-screen code on a display of a mobile device are described. A code is displayed on a mobile device as an on-screen code. The user holds the mobile device in front of a code scanner so that the on-screen code can be scanned. A code stabilization application on the mobile device assists in stabilizing and/or centering the on-screen code through changing its position, shape, and/or size based on data and/or measurements from sensors. The code stabilization application stabilizes the on-screen code for easy scan-ability to speed up the scanning process.

20 Claims, 7 Drawing Sheets

ON-SCREEN CODE STABILIZATION

CROSS REFERENCE TO RELATED APPLICATION

This application is a continuation of U.S. application Ser. No. 14/459,230, filed Aug. 13, 2014, which is hereby incorporated by reference in its entirety.

BACKGROUND

Field of the Invention

The present invention generally relates to stabilizing an on-screen code on a mobile device for scanning by a code scanner.

Related Art

A user may present a code displayed on a mobile device, such as a barcode or a Quick Response (QR) code, to make a purchase from a merchant or to present an e-ticket at an airport or an event. The code is scanned by a code scanner. When the scanning process takes a few moments, the user may believe that it is user error in the placement of the code relative to the code scanner. The user may shift the mobile device around to adjust the code in an attempt to get the code scanned. However, the code scanner can detect the code in most positions as long as it is stable. Whether the user moves the code intentionally to have it read or unintentionally due to unsteady hands, movement of the code disrupts the scanning process and adds to the time it takes to complete the scan.

Figure 1:
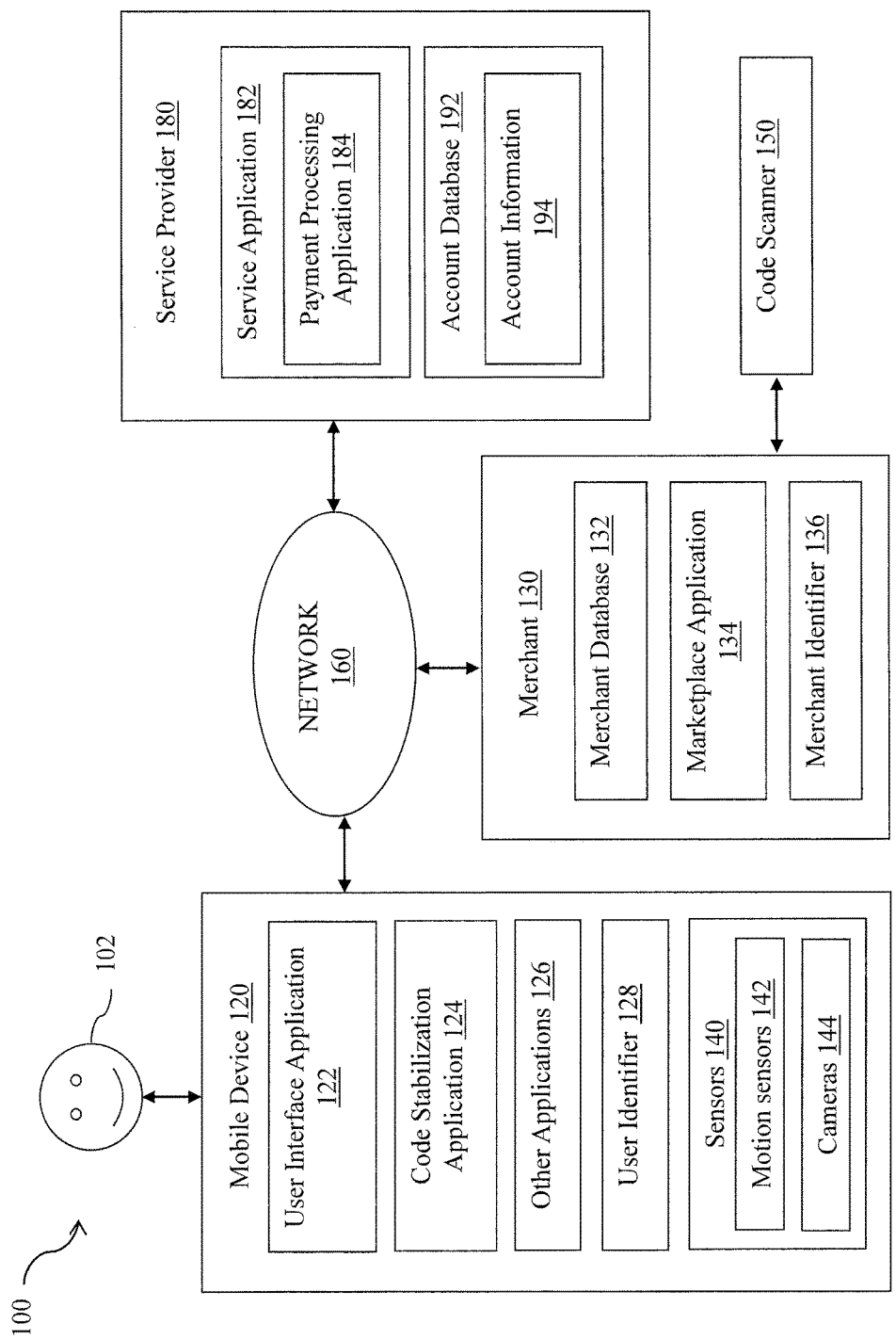
FIG. 1 is a block diagram illustrating a system for stabilizing an on-screen code according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes stabilizing and/or centering a code that is displayed on a user device to facilitate scanning by a code scanner. The user device may be a mobile device, such as a mobile phone, smart watch, or a tablet. The code displayed on the user device, i.e., the on-screen code, is adjusted in response to motion detected by sensors in the user device. The on-screen code may be a barcode, such as a QR code. The on-screen code can be used, for example, to make a payment, identify a user, enable a digital wallet experience at the time of payment, improve payment security, gain entry at an event, or check-in at an airport. The on-screen code is placed in front of a code scanner that scans the on-screen code.

The barcode is a coded pattern of graphical indicia that includes of a series of stripes and spaces of varying widths, the stripes and spaces having differing light reflecting characteristics. Some of the more popular barcode symbologies include: Uniform Product Code (UPC), typically used in retail stores sales; Data Matrix, typically used for labeling small electronic products; Code 39, primarily used in inventory tracking; and Postnet, which is used for encoding zip codes for U.S. mail. Barcodes may be one dimensional (1D), i.e., a single row of graphical indicia that carry information in one direction, such as a UPC barcode, or two dimensional (2D), i.e., multiple rows of graphical indicia that carry information in two directions, such as Data Matrix which includes multiple rows and columns of black and white square modules arranged in a square or rectangular pattern. Other examples of 2D barcodes include PDF417, Maxi-Code, Aztec™ barcode, and the QR Code. A QR code is a matrix barcode, readable by QR scanners, mobile phones with a camera, and smartphones. The QR code consists of modules arranged in a square pattern on a white background. The information encoded can be text, a uniform resource locator (URL) or other data.

The systems and methods described herein stabilize an on-screen code to facilitate scanning by a code scanner. An application displays a code on a mobile device as an on-screen code. The user holds the display of the mobile device in front of a code scanner so that the display is facing the code scanner for scanning of the on-screen code. A code stabilization application or module assists in stabilizing the on-screen code through changing the position, shape (e.g., to a trapezoid shape), and/or size of the on-screen code based on data and/or measurements from sensors. The sensors may comprise gyroscopes, accelerometers, and/or cameras. The code stabilization application stabilizes the on-screen code for easy scan-ability to speed up the scanning process.

For example, when the user moves the mobile device to the right relative to the code scanner, the application detects the movement and adjusts the on-screen code to the left. If the user moves the mobile device towards or away from the code scanner, the application adjusts the size of the on-screen code. Similarly, if the user tilts the mobile device relative to the code scanner, the application adjusts the size and/or shape of the on-screen code to counter this movement.

In an embodiment, the code is a payment code that is generated by a payment service provider, such as PayPal®, Inc. of San Jose, Calif. The payment code is associated with a user account, and can be used at a retail location during checkout. The payment code can be used by the user to make a payment anywhere, such as a particular retail location, and to make a payment even without Internet access. In some embodiments, the payment code is associated with at least one merchant.

In various embodiments, a payment service provider receives identifying information from a user, such as login information (e.g., user name, password, etc.). The payment service provider then generates a payment code and transmits the payment code to the user. The user receives the payment code and the payment code is displayed on a mobile device. When the user is checking out at a merchant, the payment code displayed on a mobile device is scanned by a code scanner at a point of sale (POS) of the merchant. The merchant transmits the payment code back to the payment service provider. The payment service provider receives the payment code, along with a request for a payment from the merchant, and processes the payment.

In an embodiment, the payment code is a barcode, such as a QR code, that may be scanned at a POS of a merchant Other machine readable codes may also be suitable. In certain embodiments, the payment code can be converted into a virtual card number at the POS to pay for a purchase.

In some embodiments, the user can control and set various limits on use of the payment code. For example, the user can limit the price of items to be purchased using the payment code, the places that the payment code can be used, the times of day the payment code can be used, the types of items to be purchased with the payment code, etc.

In further embodiments, use of the payment code facilitates identification of the user, the user's order, or the user's transaction at the POS. The use of the mobile application provides access to the user's location, his or her device information, and user credentials. Having one or more of these pieces of information can build stronger identity authentication.

For example, the payment code may advantageously act as the user's identification so a user need not provide the typical forms of identification (e.g., driver's license, credit card, etc.) to prove identity when picking up an item that was previously ordered. Instead, the user's mobile device is used to facilitate stronger identity authentication and improve payment security to improve the user experience.

In one embodiment, a user authenticates his identity to a mobile application run by a payment service provider such as PayPal®, Inc. of San Jose, Calif., on a mobile device. The payment service provider identifies the user, generates the payment code, and transmits the payment code to the user's mobile device. An application on the mobile device then displays the payment code on the mobile device as an on-screen code, which is scanned by a code scanner at the POS of the merchant. The payment code acts as the user's identification, as the payment code is generated with a valid login session or authorization.

In various embodiments, an electronic ticket for an event or transportation includes a code. For example, the user may provide the code to a code scanner to gain entry at an event. In another example, the user may scan the code at the airport to check-in for a flight.

By having the ability to stabilize the code if needed during scanning, various advantages are achieved. For example, both the user and the merchant are able to more quickly finish a transaction based on the code being scanned, without the scanner having to rescan the code if the device is moved. The user is spared the frustration of moving or repositioning the mobile device one or more times during the transaction. Wait times for other users may be reduced, thereby providing a better experience for consumers.

FIG. 1 shows one embodiment of a block diagram of a network-based system 100 that includes a mobile device 120 configured to stabilize an on-screen code on the mobile device according to an embodiment of the present disclosure. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, system 100 includes mobile device 120 (e.g., a smartphone), one or more merchant servers or devices 130 (e.g., network server devices), one or more code scanners or readers 150, and at least one payment service provider server or device 180 (e.g., network server device) in communication over a network 160. Network 160, in one embodiment, may be implemented as a single network or a combination of multiple networks. For example, in various embodiments, network 160 may include the Internet and/or one or more intranets, landline networks, wireless networks, and/or other appropriate types of communication networks. In another example, network 160 may comprise a wireless telecommunications network (e.g., cellular phone network) adapted to communicate with other communication networks, such as the Internet. As such, in various embodiments, mobile device 120, merchant servers or devices 130, and payment service provider server or device 180 may be associated with a particular link (e.g., a link, such as a URL (Uniform Resource Locator) to an IP (Internet Protocol) address).

Mobile device 120, in one embodiment, may be utilized by a user 102 to interact with payment service provider server 180 over network 160. For example, user 102 may conduct financial transactions (e.g., account transfers) with payment service provider server 180 via mobile device 120. Mobile device 120, in various embodiments, may be implemented using any appropriate combination of hardware and/or software configured for wired and/or wireless communication over network 160. In various implementations, mobile device 120 may include at least one of a wireless cellular phone, wearable computing device, satellite phone, computing tablet, etc.

Mobile device 120, in one embodiment, includes a user interface application 122, which may be utilized by user 102 to conduct transactions (e.g., shopping, purchasing, bidding, etc.) with merchant server or device 130 or with payment service provider server 180 over network 160. In one aspect, purchase expenses may be directly and/or automatically debited from an account related to user 102 via user interface application 122.

In one implementation, user interface application 122 comprises a software program, such as a graphical user interface (GUI), executable by a processor that is configured to interface and communicate with payment service provider server 180 via network 160. In another implementation, user interface application 122 comprises a browser module that provides a network interface to browse information available over network 160. For example, user interface application 122 may be implemented, in part, as a web browser to view information available over network 160.

In an example, user 102 is able to access merchant websites or apps via one or more merchant servers 130 to view and select items for purchase, and user 102 is able to purchase items from one or more merchant servers 130 via service provider server 180. Accordingly, in one or more embodiments, user 102, in person or remotely, may conduct transactions (e.g., purchase and provide payment for one or more items) from one or more merchant servers 130 via service provider server 180.

Mobile device 120, in various embodiments, includes a code stabilization application 124. Code stabilization application 124 may be a module in another application or a separate application. Code stabilization application 124 stabilizes an on-screen code by redisplaying the code on the display of mobile device 120 by adjusting the position, shape, size, or a combination thereof, of the on-screen code. Code stabilization application 124 may receive data and/or measurements from sensors 140 of mobile device 120. Code stabilization application 124, in several embodiments, is developed by a payment service provider and is downloaded to mobile device 120 from the payment service provider website. Code stabilization application 124, in certain embodiments, generates codes on mobile device 120, accesses data from sensors 140, detects movement, and adjusts the on-screen code in response to the detected movements.

In various embodiments, mobile device 120 includes one or more sensors 140, such as motion sensors 142 and/or cameras 144. Motion sensors 142 can monitor, detect, and/or measure movement, velocity, acceleration of mobile device 120, such as translational motion, translational velocity, translational acceleration, rotation, angular velocity, and angular acceleration. Motion sensors 142 may comprise one or more gyroscopes and/or one or more accelerometers. Thus, motion sensors 142 are configured to detect when mobile device 120 has been tilted on any axis, moved left or right, forward or backwards, and up or down by user 102. Motion sensors 142 may be accessed by code stabilization application 124.

Cameras 144 may be configured to capture images, monitor and detect movement of objects, and sense depth. A front-facing camera may detect code scanner 150, or a part of code scanner 150, and determine the center of code scanner 150. The front-facing camera may also detect whether mobile device 120 is facing, or turned away from, the face of user 102. In an embodiment, mobile device 120 includes at least two front-facing cameras configured to determine distance to objects. For example, mobile device 120 may include a main front-facing camera and two or more depth-sensing cameras to sense distance to objects.

Mobile device 120, in various embodiments, may include other applications 126 as may be desired in one or more embodiments of the present disclosure to provide additional features available to user 102. In one example, such other applications 126 may include security applications for implementing client-side security features, programmatic client applications for interfacing with appropriate application programming interfaces (APIs) over network 160, and/or various other types of generally known programs and/or software applications. In still other examples, other applications 126 may interface with user interface application 122 for improved efficiency and convenience.

In various implementations, a user profile may be created using data and information obtained from cell phone activity over network 160. Cell phone activity transactions may be used by payment service provider server 180 to create at least one user profile for user 102 based on activity from mobile device 120 (e.g., cell phone). The user profile may be updated with each financial and/or information transaction (e.g., payment transaction, purchase transaction, etc.) achieved through use of mobile device 120. In various aspects, this may include the type of transaction and/or the location information from mobile device 120. As such, the profile may be used for recognizing patterns of potential fraud, setting transaction limits on the user, etc.

Mobile device 120, in one embodiment, may include at least one user identifier 128, which may be implemented, for example, as operating system registry entries, cookies associated with user interface application 122, identifiers associated with hardware of mobile device 120, or various other appropriate identifiers. User identifier 128 may include one or more attributes related to user 102, such as personal information related to user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, user identifier 128 may be passed with a user login request to payment service provider server 180 via network 160, and user identifier 128 may be used by payment service provider server 180 to associate user 102 with a particular user account maintained by payment service provider server 180.

In various implementations, user 102 is able to input data and information into an input component (e.g., a touchscreen, a keyboard, etc.) of mobile device 120 to provide user information with a transaction request, such as a fund transfer request. The user information may include user identification information.

One or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering the items to user 102 over network 160. As such, each of one or more merchant servers 130 may include a merchant database 132 for identifying available items, which may be made available to mobile device 120 for viewing and purchase by user 102. In one or more embodiments, user 102 may complete a transaction such as purchasing the items via payment service provider server 180.

Each of the merchant servers 130, in one embodiment, may include a marketplace application 134, which may be configured to provide information over network 160 to user interface application 122 of mobile device 120. For example, user 102 may interact with marketplace application 134 through user interface application 122 over network 160 to search and view various items available for purchase in merchant database 132.

Each of the merchant servers 130, in one embodiment, may include at least one merchant identifier 136, which may be included as part of the one or more items made available for purchase so that, for example, particular items are associated with particular merchants. In one implementation, merchant identifier 136 may include one or more attributes and/or parameters related to the merchant, such as business and banking information. In various embodiments, user 102 may conduct transactions (e.g., searching, selection, monitoring, purchasing, and/or providing payment for items) with each merchant server 130 via payment service provider server 180 over network 160.

A merchant website may also communicate (e.g., using merchant server 130) with the service provider through payment service provider server 180 over network 160. For example, the merchant website may communicate with the payment service provider in the course of various services offered by the payment service provider to merchant website, such as payment intermediary between customers of the merchant website and the merchant website itself. For example, the merchant website may use an application programming interface (API) that allows it to offer sale of goods in which customers are allowed to make payment through the payment service provider, while user 102 may have an account with the payment service provider that allows user 102 to use the payment service provider for making payments to merchants that allow use of authentication, authorization, and payment services of payment service provider as a payment intermediary. The merchant website may also have an account with the payment service provider.

Code scanner or reader 150 may include one or more devices or systems used to read codes on mobile devices 120. For example, code scanner 150 may include a barcode scanner/reader or a QR code scanner/reader. Code scanner 150 is typically positioned at a POS of a merchant. Examples of suitable locations for the POS include, but are not limited to, an entrance to or within an event, such as a concert, sporting event, convention, trade show, movie theater, theater, fair, etc., airline security checkpoints and boarding gates, unmanned kiosks and vending machines, transportation (e.g., train, subway, bus) entrances and exits, etc.

Payment service provider server 180, in one embodiment, may be maintained by a transaction processing entity or an online service provider, which may provide processing for financial transactions and/or information transactions between user 102 and one or more of the merchant servers 130. As such, payment service provider server 180 includes a service application 182, which may be adapted to interact with mobile device 120 and/or each merchant server 130 over network 160 to facilitate the searching, selection, purchase, and/or payment of items by user 102 from one or more of the merchant servers 130. In one example, payment service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

Service application 182, in one embodiment, utilizes a payment processing application 184 to process purchases and/or payments for financial transactions between user 102 and each merchant server 130. In one implementation, the payment processing application 184 assists with resolving financial transactions through validation, delivery, and settlement. As such, service application 182 in conjunction with payment processing application 184 settles financial transactions between user 102 and each merchant 130, wherein accounts may be directly and/or automatically debited and/or credited of monetary funds in a manner as accepted by the banking industry.

Payment service provider server 180, in one embodiment, may be configured to maintain one or more user accounts and merchant accounts in an account database 192, each of which may include account information 194 associated with one or more individual users (e.g., user 102) and merchants (e.g., one or more merchants associated with merchant servers 130). For example, account information 194 may include private financial information of user 102 and each merchant associated with one or more merchant servers 130, such as one or more account numbers, passwords, credit card information, banking information, or other types of financial information, which may be used to facilitate financial transactions between user 102, and one or more merchants associated with the merchant servers 130. In various aspects, the methods and systems described herein may be modified to accommodate users and/or merchants that may or may not be associated with at least one existing user account and/or merchant account, respectively.

In one implementation, user 102 may have identity attributes stored with payment service provider server 180, and user 102 may have credentials to authenticate or verify identity with payment service provider server 180. User attributes may include personal information, banking information and/or funding sources. In various aspects, the user attributes may be passed to payment service provider server 180 as part of a login, search, selection, purchase, and/or payment request, and the user attributes may be utilized by payment service provider server 180 to associate user 102 with one or more particular user accounts maintained by payment service provider server 180.

Figure 2:
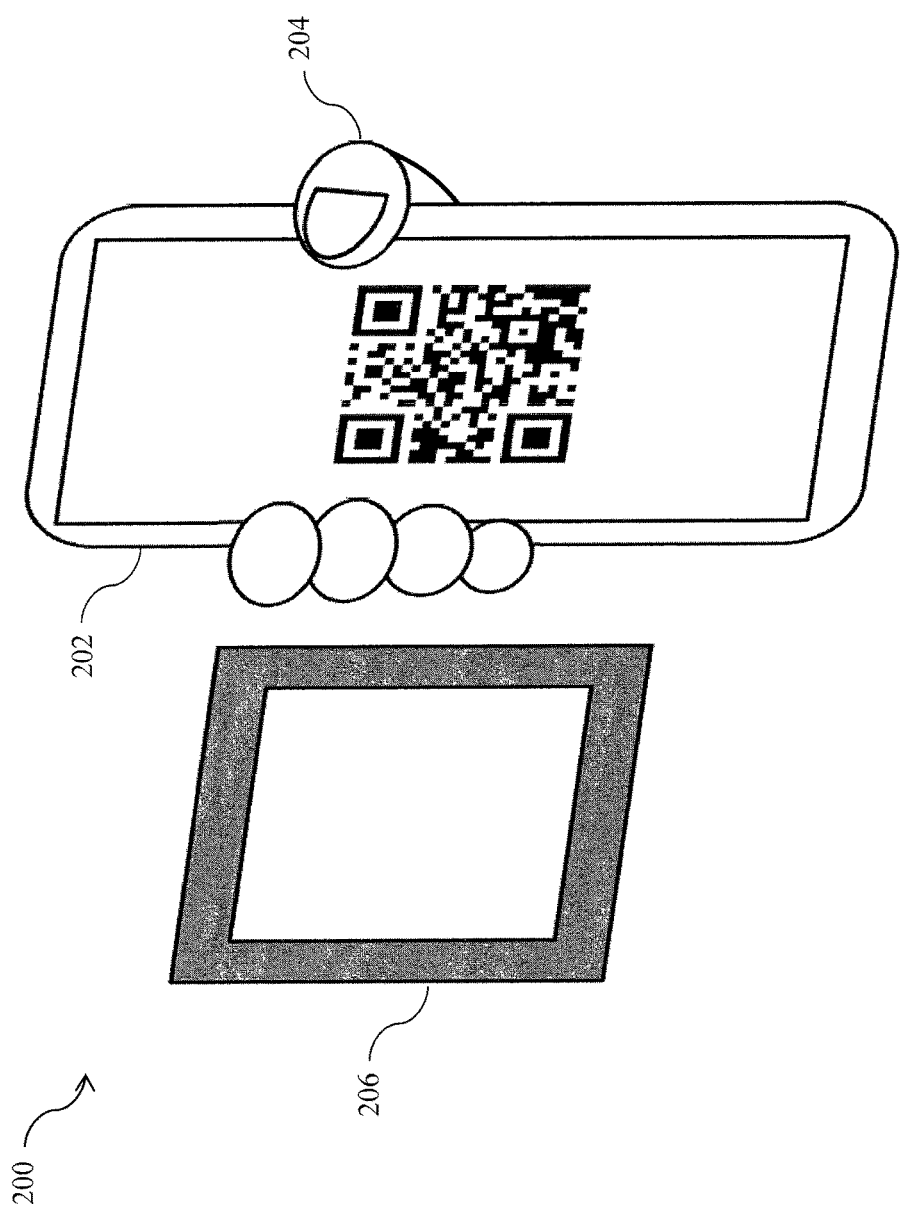
FIG. 2 is a flowchart showing a method for stabilizing an on-screen code according to an embodiment of the present disclosure.

Referring now to FIG. 2, illustrated is a scene 200 of mobile device 202 displaying a code held in front of code scanner 150 by user 102 according to an embodiment of the present disclosure. Mobile device 202 displaying a code held by a hand 204 of user 102 is placed in front of a code scanning component 206 of code scanner 150. Code scanning component 206 scans the on-screen code. Mobile device 202 is implemented in a similar manner as mobile device 120 described above.

Figure 3:
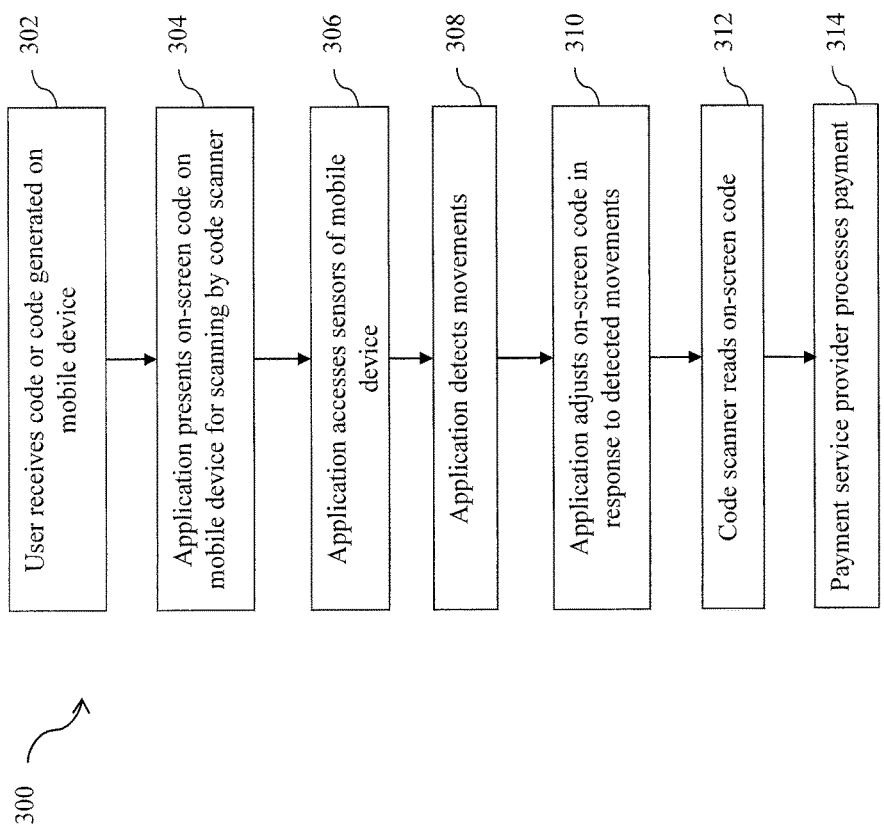
FIG. 3 is an illustration of a mobile device displaying a code held in front of a code scanner by a user according to an embodiment of the present disclosure.

Referring now to FIG. 3, a flowchart of a method 300 for stabilizing an on-screen code on mobile device 120 is illustrated according to an embodiment of the present disclosure. Code generation may be triggered by the manually by the user or automatically by the system. For example, the user may send a request through mobile device 120, such as by selecting a "Request Code" button from a service provider app. In another example, mobile device 120 may be detected as being in a payment situation, such as entering a merchant store, entering a checkout line, or receiving a payment request from the merchant Codes may also accessible through mobile device 120, such that the user can retrieve a code to be displayed.

At step 302, user 102 receives a code from a payment service provider, or a code-generating application on mobile device 120 generates a code. In an embodiment, payment service provider server 180 generates and sends a code to mobile device 120. The code may be a payment code associated with a user account maintained by the payment service provider. Further, the payment service provider may store user account information 194 in account database 192 that includes one or more accounts of user 102. The payment code may be linked to the account such that when the payment code is presented to a merchant, the account to be used for the transaction is designated. In another embodiment, a user 102 receives an e-ticket that includes the code. For example, user 102 may receive an e-ticket from an airline for a flight that includes a barcode that can be scanned during check-in and/or boarding process.

In a further embodiment, user 102 uses a code-generating application on the mobile device 120 to generate a code. The code-generating application may be an application provided by a payment service provider, or by a third-party service provider. When the code is generated by an application of the payment service provider and the code is transmitted to payment service provider server 180, payment service provider server 180 is able to identify a user account associated with the code and/or authenticate the code, for example, based on an algorithm used for generating the code implemented by the payment service provider.

In an embodiment, user 102 registers with a payment service provider. Registration may include signing up for the service and agreeing to any terms required by the payment service provider, such as through a user device. The user device may be a mobile computing device, such as a smart phone, a PC, or a computing tablet. Registration may be done completely through the user device, partially through the user device, or without using the user device, such as through a phone call or in-person visit to a representative of the payment service provider.

User 102 may be requested to provide specific information for registration, such as, but not limited to, a name, address, phone number, email address, picture, a user name for the account, and a password or PIN for the account. The type of information may depend on whether the user already has an account with the payment service provider. Requested information may be entered through the user device or other means, including voice or manual key entry. Once all the requested information is received and confirmed, the payment service provider may create an account for user 102.

In some embodiments, user 102 provides identifying data, e.g., user name, password, etc., before user 102 can use the code. For example, user 102 may be required to provide identifying data before receiving the code or generating the code on mobile device 120. In another example, user 102 may be required to provide identifying data when the code is to be presented on the display of mobile device 120 for use.

The code, in one embodiment, is randomly generated, such as a random barcode. In some exemplary embodiments, the payment code may be a random one-time use code that is generated by the payment service provider executing a random character generation program. The payment code may be sent to mobile device 120 of user 102 in any suitable way, including by email, text, push notification, or by download from payment service provider server 180 through an application or a web browser. In certain embodiments, limitations or restrictions may be associated with the code, such as amount, time of use, type of purchase, etc.

At step 304, an application on the mobile device (e.g., code-generating application or code stabilization application 124) presents the code on a display of mobile device 120 as an on-screen code. In an embodiment, before or after the code is generated, user 102 may browse and select items that he or she wishes to purchase at a merchant. When user 102 is ready to pay for the purchase, user 102 uses the application to display the on-screen code on mobile device 120 and places the on-screen code in front of code scanner/reader 150 at the POS of the merchant.

At step 306, code stabilization application 124, which may be a part of the application used to display the on-screen code or a separate application, accesses sensors 140 of mobile device 120. In an embodiment, code stabilization application 124 accesses motion sensors 142 comprising a gyroscope and/or an accelerometer. In some embodiments, code stabilization application 124 accesses one or more cameras 144 of mobile device 120. In other embodiments, code stabilization application 124 accesses both motion sensors 142 and cameras 144. Code stabilization application 124 receives data and/or measurements from sensors 140. To conserve power, sensors 140 may only be activated when a possible code scan is determined, such as the code being displayed on mobile device 120 and/or cameras 144 on mobile device 120 detecting code scanner/reader 150 facing the display of mobile device 120.

At step 308, code stabilization application 124 detects movements using sensors 140. In certain embodiments, code stabilization application 124 detects movements by accessing motion sensors 142. The code stabilization application 124 can then compute movements of mobile device 120 based on data and/or measurements received from motion sensors 142.

In other embodiments, code stabilization application 124 receives data from a front-facing camera of the mobile device. The front-facing camera detects code scanner/reader 150, or one or more parts of code scanner/reader 150, and determines movement relative to code scanner/reader 150.

At step 310, code stabilization application 124, which can use various known image stabilization methods, adjusts the on-screen code in response to the movements that are detected by sensors 140. In an embodiment, the on-screen code is adjusted by redisplaying the on-screen code on the display at an adjusted position, adjusted shape, and/or adjusted size such that the on-screen code is stable relative to code scanner/reader 150. The on-screen code is adjusted such that the code remains the same from the perspective of code scanner/reader 150.

In some embodiments, code stabilization application 124 uses data from the front-facing camera to adjust the on-screen code. The on-screen code is adjusted such that the center of the on-screen code is aligned with the center of code scanner/reader 150.

In various embodiments, code stabilization application 124 starts adjusting the on-screen code when the display is facing code scanner 150. Code stabilization application 124 determines or approximates when the on-screen code has been turned to face code scanner 150. Code stabilization application 124 bases the timing of when to start adjusting on such determination or approximation. In one embodiment, code stabilization application 124 starts adjusting the on-screen code a specific length of time after the on-screen code is displayed on mobile device 120. The on-screen code is displayed, then there is a delay for a predetermined time period (e.g., 2-3 seconds) to give user 102 time to turn mobile device 120 towards code scanner 150, and then code stabilization application 142 starts to adjust the on-screen code.

In another embodiment, code stabilization application 124 starts adjusting the on-screen code when code stabilization application 124 determines through motion sensors 142 that user 102 has turned mobile device 120. Code stabilization application 124 may be programmed to determine that when user 102 rotates mobile device 120 to one of several preset angles, the on-screen code has been turned to face code scanner 150. The predetermined angles can include the various angles that correspond to a variety of ways that code scanner 150 may be set up. Code scanner 150 may be directly facing user 102 so that mobile device 120 has to be turned by about 180 degrees to face code scanner 150. Code scanner 150 may be facing sideways such that mobile device 120 has to be turned by about 90 degrees. For example, when user 102 uses code stabilization application 124 to display the on-screen code and code stabilization application 124 detects a rotation of 90 degrees, code stabilization application 124 determines that the mobile device 120 has been turned to face code scanner 150 and accordingly starts to adjust the on-screen code.

In some embodiments, code stabilization application 124 starts adjusting the on-screen code based on camera 144 of mobile device 120. For example, the front-facing camera may be configured to determine whether it is facing a face of user 102. Code stabilization application 124 may access the front-facing camera and only start adjusting the on-screen code when the front-facing camera has been turned away from the face, i.e., the face is no longer detected by the front-facing camera. In another example, the front-facing camera may be configured to detect code scanner 150, or one or more parts of code scanner 150, such as code scanning component 306. Code stabilization application 124 may access the front-facing camera and start adjusting the on-screen code when the front-facing camera detects code scanner 150 or the one or more parts of code scanner 150, so that code stabilization application 124 only adjusts the on-screen code while it is facing code scanner 150 to be scanned.

In an embodiment, code stabilization application 124 adjusts the on-screen code for a predetermined time period. For example, code stabilization application 124 may adjust the on-screen code for a time period that it usually takes for a scan to occur (e.g., 5-15 seconds), or a longer time period (e.g., 1-2 minutes).

In another embodiment, code stabilization application 124 adjusts the on-screen code for a predetermined time period, then resets, and again starts adjusting the on-screen code. When code scanner 150 is not able to scan the on-screen code at a first stabilized position, the on-screen code is stabilized at a second stabilized position after a predetermined time period. The predetermined time period may be the average time it takes for a scan to occur when the on-screen code is positioned in a correct orientation. For example, if code stabilization application 124 is stabilizing the on-screen code at a position that is out of scanning range, by providing a restart of the adjustment after a predetermined time period, the on-screen code can be re-centered on mobile device 120 and stabilized at a new position. Thus, code stabilization application 124 has a self-correcting mechanism.

At step 312, code scanner 150 reads the on-screen code. For example, code scanner 150 reads the on-screen code by detecting light emitted by the display of mobile device 120. In another example, code scanner 150 emits a source light, which bounces off the display of the mobile device 120, and detects the light that is bounced back. In an embodiment, code scanner 150 is located at a POS of a merchant.

At step 314, when the on-screen code is being used to make a purchase at a merchant, user 102 authorizes a payment from the user account to the merchant based on the scan of the on-screen code by code scanner 150 at the POS. In an embodiment, the code is transmitted from code scanner 150 to merchant server or device 130. The payment service provider receives the code and a request for payment from merchant server or device 130. Payment service provider server 180 verifies the code as the code associated with the user account, and may also verify any limitations or restrictions associated with the code. Payment service provider server 180 approves and processes the payment from the user account to the merchant. After processing, payment service provider server 180 may then transmit a notification to user 102 and/or merchant server or device 130.

Figure 4A:
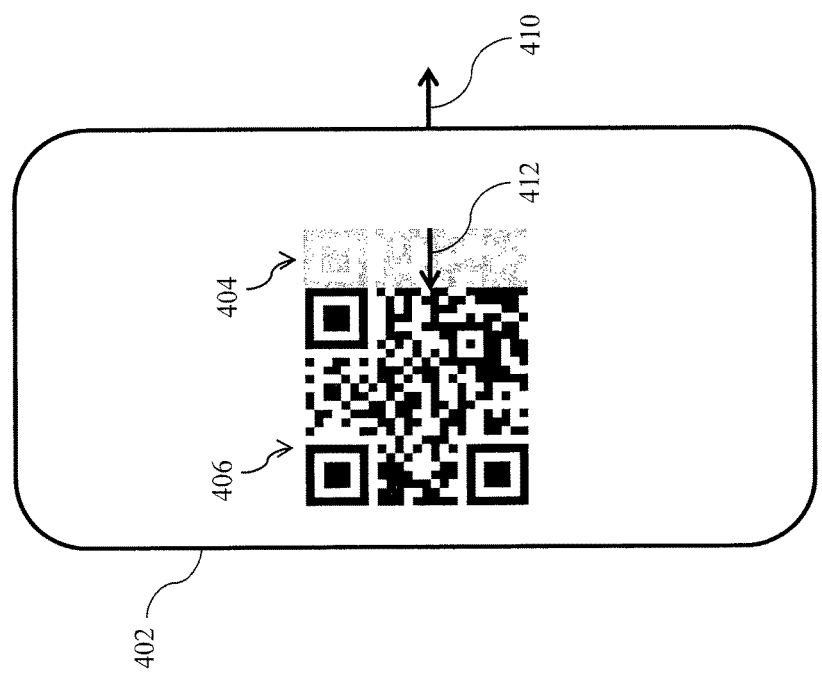
FIGS. 4A-D are illustrations of an on-screen code that is adjusted in response to movement of a mobile device according to an embodiment of the present disclosure.

Now referring to FIGS. 4A-D, on-screen codes that are adjusted in response to movement of a mobile device 402 are illustrated according to an embodiment of the present disclosure. FIG. 4A illustrates adjusting of the code-image on mobile device 402 in response to translational motion, including horizontal and vertical movements. When mobile device 402 is moved in a direction 410, the on-screen code that was displayed in a first location 404 is redisplayed at a second location 406 in response to the movement. Mobile device 402 displays the on-screen code at first location 404 before mobile device 402 is moved. Code stabilization application 124 uses sensors 140 comprising accelerometers to detect that mobile device 120 is being moved in direction 410, and determines a magnitude of translational motion, direction of movement, velocity of movement, and acceleration of movement. In response to the movement, code stabilization application 124 dynamically redisplays the on-screen code in second position 406. With respect to mobile device 402, the position of the on-screen code has been adjusted in a direction 412 that is opposite the direction of movement of mobile device 402. Code stabilization application 124 may calculate second position 406 based on the magnitude of translational motion, the direction 404 of movement, the velocity of movement, and/or the acceleration of movement.

Figure 4C:
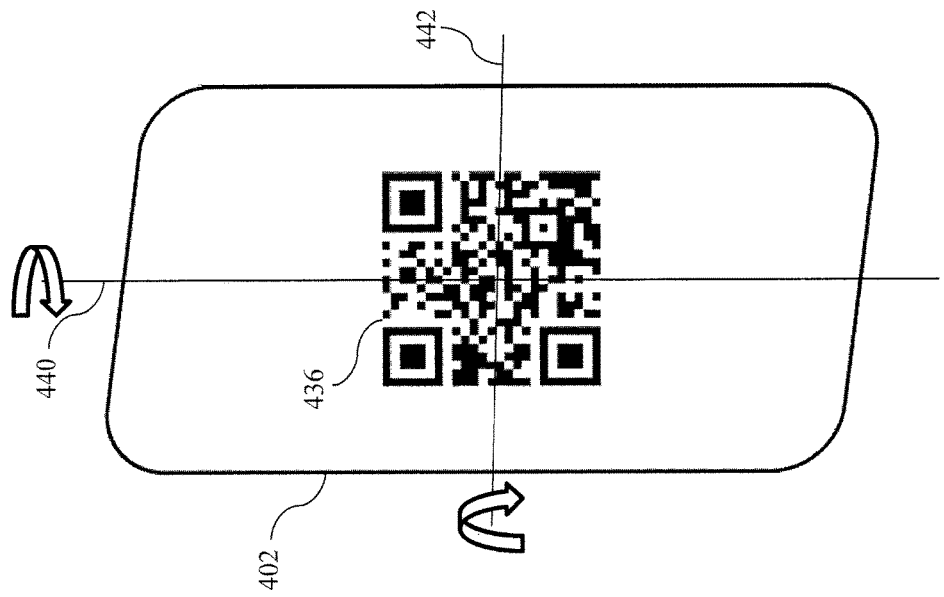
Figure 4B:
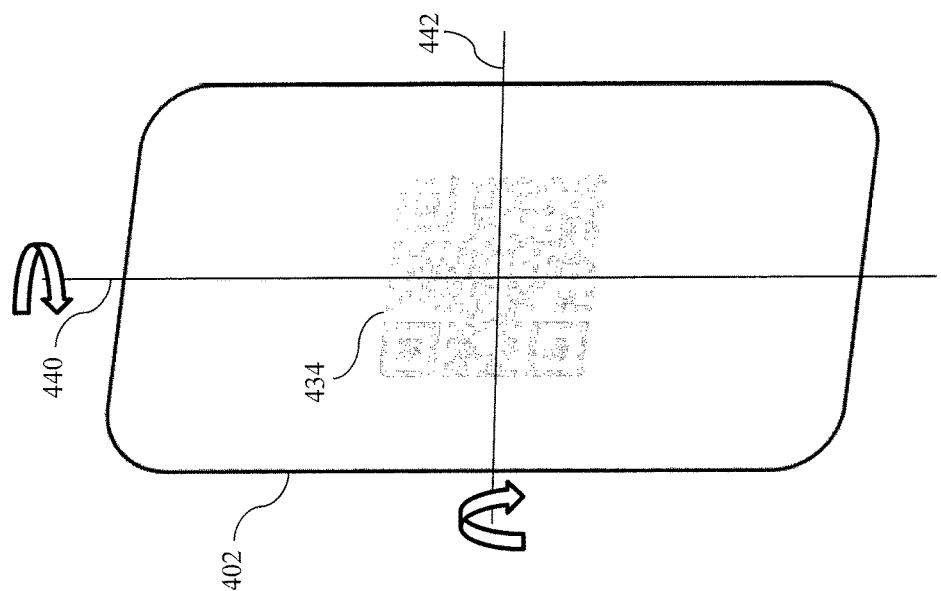

FIGS. 4B and 4C illustrate adjusting the code-image on mobile device 402 in response to rotational movement. When mobile device 402 is rotated along one or more axes 440, 442, the on-screen code that was displayed with a first shape 434 is redisplayed with a second shape 436 in response to the rotation. Mobile device 402 displays the on-screen code with first shape 434 before mobile device 402 is rotated. Code stabilization application 124 uses sensors 140 comprising gyroscopes to detect that mobile device 402 is being rotated. Code stabilization application 124 determines magnitude of rotation, axis of rotation, direction of rotation, angular velocity, and/or angular acceleration. In response to the rotation, code stabilization application 124 dynamically redisplays the on-screen code with second shape 436. Code stabilization application 124 may calculate second shape 436 based on the magnitude of rotation, the axis of rotation, the direction of rotation, the angular velocity, and/or the angular acceleration.

In certain embodiments, for further accuracy, code stabilization application 124 determines and/or measures a distance to code scanner 150 and calculates second shape 436 further based on the distance to code scanner 150. In an embodiment, code stabilization application 124 accesses camera 144 comprising a front-facing camera to determine distance. For example, code stabilization application 124 may determine distance based on a standard size of code scanner 150 and/or code scanning component 206. In another example, code stabilization application 124 may determine distance based on a reference marker on code scanner 150. The reference marker may have a standard size such that it can be used for distance determinations. In another embodiment, code stabilization application 124 accesses cameras 144 comprising at least two front-facing cameras configured to sense depth to determine distance to code scanner 150.

Figure 4D:
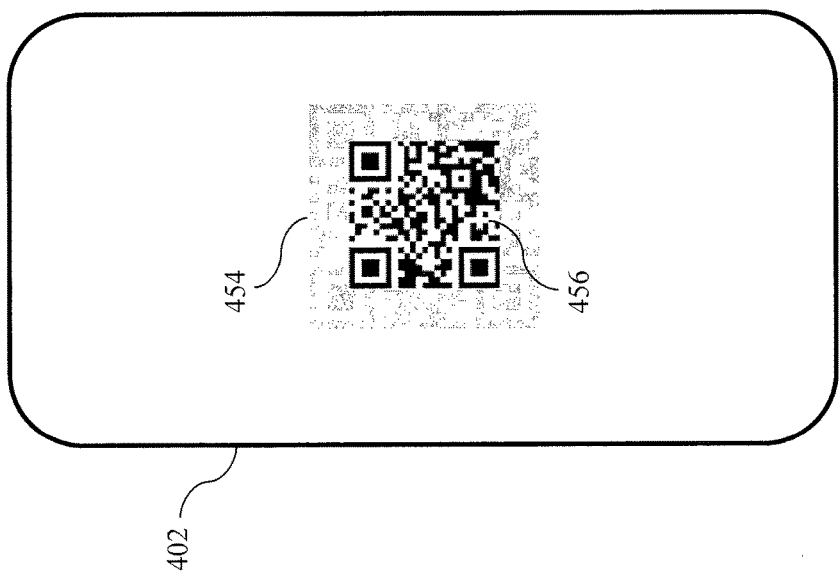

FIG. 4D illustrates adjusting the code-image on mobile device 402 in response to movement towards or away from code scanner 150. When mobile device 402 is moved forward, the on-screen code that was displayed in a first size 454 is redisplayed at a second size 456 in response to the movement. Mobile device 402 displays the on-screen code at first size 454 before mobile device 402 is moved. Code stabilization application 124 uses sensors 140 comprising accelerometers to detect that mobile device 402 is being moved forwards or backwards, and determines a magnitude of movement, direction of movement, velocity of movement, and/or acceleration of movement. In response to the movement, code stabilization application 124 dynamically redisplays the on-screen code in second size 456 such that the size remains the same from the point of view of the scanner. Code stabilization application 124 may calculate second size 456 based on the magnitude of movement, the direction of movement, the velocity of movement, the acceleration of movement, and/or the distance to code scanner 150.

In certain embodiments, for further accuracy, code stabilization application 124 determines distance to code scanner 150 and calculates second size 456 further based on distance to code scanner 150. In an embodiment, code stabilization application 124 uses camera 144 comprising a front-facing camera to determine distance based on a standard size of code scanner 150 and/or code scanning component, or based on a reference marker on code scanner 150. In another embodiment code stabilization application accesses cameras 144 comprising at least two front-facing cameras configured to sense depth to determine distance to code scanner 150.

When the movement of mobile device 402 includes more than one of translational motion, rotation, and movement forwards or backwards, code stabilization application 124 performs adjustments comprising a combination of position adjustments, shape adjustments, and/or size adjustments, discussed above.

Figure 5:
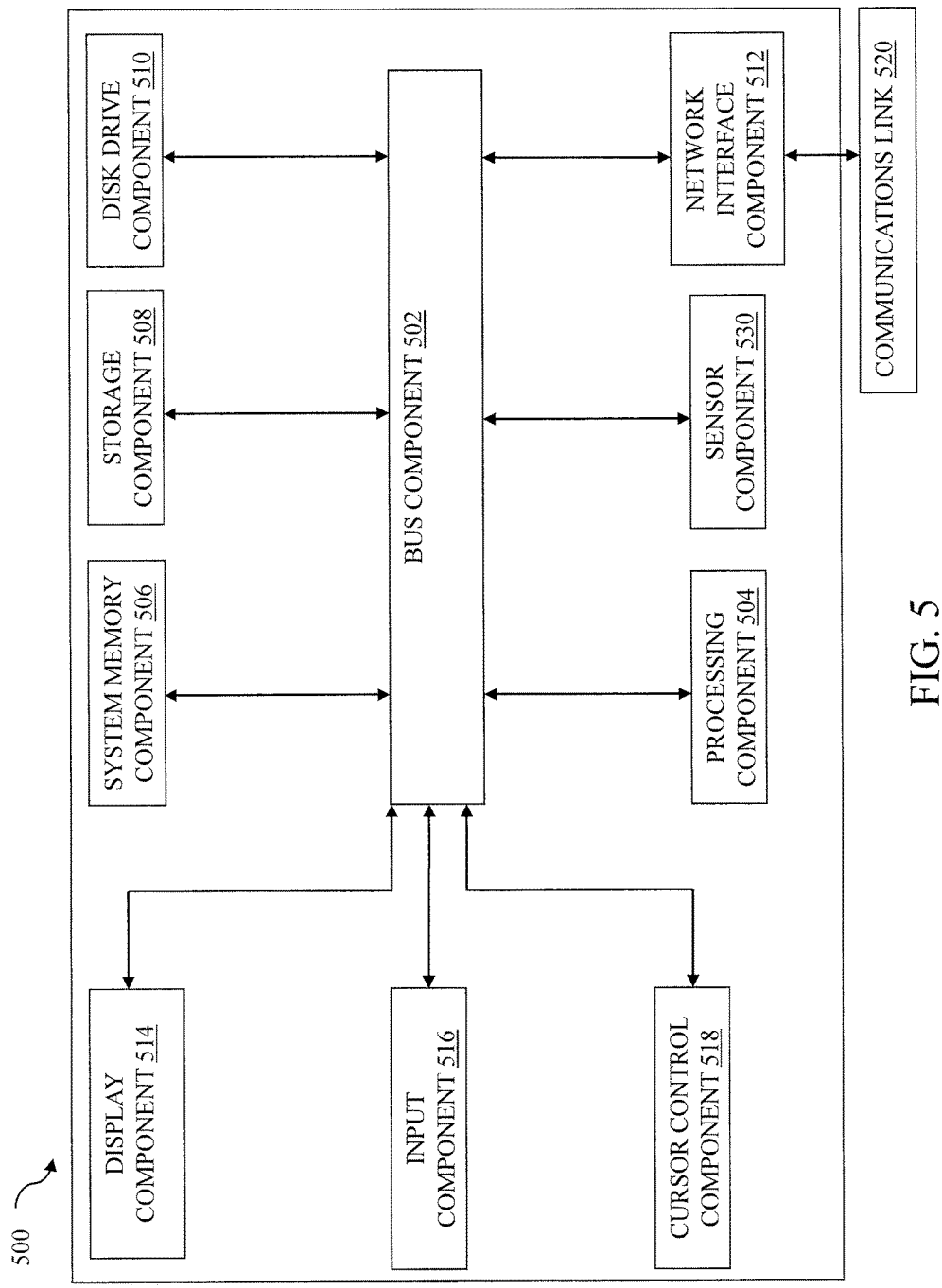
FIG. 5 is a block diagram of a system for implementing one or more components in FIG. 1 according to an embodiment of the present disclosure.

Referring now to FIG. 5, a block diagram of a system 500 is illustrated suitable for implementing embodiments of the present disclosure, including mobile device 120, one or more merchant servers or devices 130, and payment service provider server or device 180. System 500, such as part of a cell phone, a tablet, a personal computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), a cursor control component 518 (e.g., a mouse pad), and a sensor component 530 (e.g., gyroscope, accelerometer, and/or cameras). In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to present an on-screen code on a display of a mobile device, access measurements on one or more sensors of the mobile device, detect movements of the mobile device based on the measurements, and adjust the on-screen code to counteract movements based on the measurements, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., network 160 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

In view of the present disclosure, it will be appreciated that various methods and systems have been described according to one or more embodiments for stabilizing an on-screen code on a display of a mobile device.

Although various components and steps have been described herein as being associated with user device 120, merchant server 130, and payment service provider server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A mobile system, comprising:
a non-transitory memory; and one or more hardware processors coupled to the non-transitory memory and configured to read instructions from the non-transitory memory to cause the mobile system to perform operations comprising:
causing a screen of the mobile system to display a code;
detecting that the screen of the mobile system is facing a code scanning device based on data received from an image sensor of the mobile system;
in response to detecting that the screen of the mobile system is facing the code scanning device, detecting one or more movements of the mobile system relative to the code scanning device using the image sensor and at least one other sensor of the mobile system; and
changing one or more positions of the code displayed on the screen based at least on the one or more detected movements of the mobile system relative to the code scanning device.

2. The mobile system of claim 1, wherein detecting that the screen of the mobile system is facing the code scanning device is further based on detected movements of the mobile system.

3. The mobile system of claim 1, wherein detecting the one or more movements comprises detecting a distance from the mobile system to the code scanning device.

4. The mobile system of claim 1, wherein the one or more detected movements of the mobile system comprises one or more rotations of the mobile system, and wherein the one or more positions of the code displayed on the screen is changed based at least on the one or more detected rotations of the mobile system.

5. The mobile system of claim 1, wherein changing the one or more positions of the code comprises changing a size or a shape of the code based at least on the one or more detected movements.

6. The mobile system of claim 1, wherein the one or more detected movements of the mobile system comprises at least one of a translational motion, a rotational motion, a velocity, or an acceleration.

7. A non-transitory machine-readable medium having stored thereon machine-readable instructions executable to cause a machine to perform operations comprising:
causing a screen of a mobile device to display a code;
using an image sensor of the mobile device to detect that a code scanning device is in a position to scan the code displayed on the screen;
in response to detecting that the code scanning device is in the position to scan the code, detecting one or more movements of the mobile device relative to the code scanning device; and
changing one or more positions of the code displayed on the screen based at least on the one or more detected movements of the mobile device.

8. The non-transitory machine-readable medium of claim 7, wherein the code scanning device is detected in the position to scan the code displayed on the screen based at least on an image obtained from the image sensor of the mobile device.

9. The non-transitory machine-readable medium of claim 7, wherein detecting the code scanning device is in the position to scan the code displayed on the screen comprises detecting a distance from the mobile device to the code scanning device.

10. The non-transitory machine-readable medium of claim 7, wherein the one or more detected movements of the mobile device comprises one or more rotations of the mobile device, and wherein the one or more positions of the code displayed on the screen is changed based at least on the one or more detected rotations of the mobile device.

11. The non-transitory machine-readable medium of claim 7, wherein changing the one or more positions of the code comprises changing a size or a shape of the code based at least on the one or more detected movements.

12. The non-transitory machine-readable medium of claim 7, wherein the one or more detected movements of the mobile device comprises at least one of a translational motion, a rotational motion, a velocity, or an acceleration.

13. A method, comprising:
causing a screen of a mobile device to display a code;
using an image sensor to detect that a code scanning device is in a first position;
detecting the mobile device is in a second position with respect to the code scanning device such that the code scanning device is able to scan the code displayed on the screen;
in response to detecting that the mobile device is in the second position, detecting a movement of the mobile device relative to the code scanning device; and
changing a display configuration of the code displayed on the screen based at least on the detected movement of the mobile device.

14. The method of claim 13, wherein detecting the movement comprises detecting a movement associated with the second position of the mobile device, and wherein the display configuration of the displayed code is changed based on the movement associated with the second position of the mobile device.

15. The method of claim 13, wherein detecting the mobile device is in the second position such that the code scanning device is able to scan the code displayed on the screen comprises detecting a distance from the mobile device to the code scanning device.

16. The method of claim 13, wherein the detected movement of the mobile device comprises a rotation of the mobile device, and wherein the display configuration of the code displayed on the screen is changed based at least on the detected rotation of the mobile device.

17. The method of claim 13, wherein changing the display configuration of the code comprises changing a size or a shape of the code based at least on the detected movement.

18. The mobile system of claim 1, wherein detecting that the screen of the mobile system is facing a code scanning device comprises:
obtaining at least one image from the image sensor; and
analyzing the at least one image to detect a location of the code scanning device with respect to the screen of the mobile system.

19. The mobile system of claim 1, wherein the code is initially displayed at a first location of the screen, wherein changing the one or more positions of the code displayed on the screen comprises:
performing first positional adjustments of the code displayed on the screen based on first movements of the mobile system detected during a first period of time, wherein the first positional adjustments comprise moving the code from the first location to a second location of the screen;
subsequent to performing the first positional adjustments, resetting the code by displaying the code at the first location of the screen; and
subsequent to resetting the code, performing second positional adjustments of the code displayed on the screen based on second movements of the mobile system detected during a second period of time.

20. The mobile system of claim 1, wherein the distance from the mobile system to the code scanning device is detected based on images obtained from the image sensor.

* * * * *